(12) United States Patent
Sigler et al.

(10) Patent No.: US 8,250,725 B2
(45) Date of Patent: Aug. 28, 2012

(54) JOINING POLYMER WORKPIECES TO OTHER COMPONENTS

(75) Inventors: David R. Sigler, Shelby Township, MI (US); Yen-Lung Chen, Troy, MI (US); Peter H. Foss, Oxford, MI (US); Alan L. Browne, Grosse Pointe, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1057 days.

(21) Appl. No.: 11/691,519

(22) Filed: Mar. 27, 2007

(65) Prior Publication Data

US 2008/0236720 A1    Oct. 2, 2008

(51) Int. Cl.
*B23P 11/02* (2006.01)
*B29C 65/06* (2006.01)
*B29C 65/00* (2006.01)

(52) U.S. Cl. ........... 29/447; 29/530; 156/293; 156/73.5; 156/308.4

(58) Field of Classification Search .............. 29/446, 29/447, 530; 156/73.5, 73.1, 293, 308.04, 156/308.4; 411/258
See application file for complete search history.

(56) References Cited

U.S. PATENT DOCUMENTS

| | | | |
|---|---|---|---|
| 272,033 A | 2/1883 | Edge | |
| 3,185,612 A * | 5/1965 | Dunham | 428/193 |
| 3,308,225 A * | 3/1967 | Wells | 264/249 |
| 3,367,809 A * | 2/1968 | Soloff | 156/73.1 |
| 3,458,618 A | 7/1969 | Burns et al. | |
| 3,754,319 A | 8/1973 | Miori | |
| 3,784,435 A * | 1/1974 | Bagheri et al. | 156/293 |
| 3,847,700 A * | 11/1974 | Dalal et al. | 156/252 |
| 3,899,116 A | 8/1975 | Mims | |
| 4,106,962 A | 8/1978 | Adams et al. | |
| 4,358,328 A * | 11/1982 | Pearson | 156/73.1 |
| 4,822,671 A | 4/1989 | Carper et al. | |
| 4,865,680 A | 9/1989 | Pierson | |
| 5,782,575 A * | 7/1998 | Vincent et al. | 403/270 |
| 5,839,847 A * | 11/1998 | Patel | 403/269 |
| 6,059,815 A * | 5/2000 | Lee et al. | 606/209 |
| 6,240,630 B1 * | 6/2001 | Lee et al. | 29/800 |
| 6,370,757 B2 * | 4/2002 | Lee et al. | 29/447 |
| 6,725,538 B2 * | 4/2004 | Sato | 29/844 |
| 7,013,536 B2 * | 3/2006 | Golden et al. | 24/442 |
| 7,013,538 B2 * | 3/2006 | Browne et al. | 24/603 |
| 7,045,090 B2 * | 5/2006 | Brozenick et al. | 264/510 |
| 7,063,811 B2 * | 6/2006 | Brozenick et al. | 264/510 |
| 7,308,738 B2 * | 12/2007 | Barvosa-Carter et al. | 24/442 |
| 7,497,917 B2 * | 3/2009 | Chen et al. | 156/73.5 |
| 7,695,656 B2 * | 4/2010 | Chen et al. | 264/68 |
| 7,836,564 B2 * | 11/2010 | Barvosa-Carter et al. | 24/442 |
| 7,900,986 B2 * | 3/2011 | Browne et al. | 296/1.02 |
| 7,955,459 B2 * | 6/2011 | Chen et al. | 156/73.5 |
| 8,096,034 B2 * | 1/2012 | Barvosa-Carter et al. | 29/419.1 |
| 2001/0047579 A1 * | 12/2001 | Lee et al. | 29/447 |

(Continued)

*Primary Examiner* — Essama Omgba
(74) *Attorney, Agent, or Firm* — Reising Ethington P.C.

(57) ABSTRACT

A shape memory polymer workpiece is attached to a second workpiece. A face of the SMP workpiece is placed against an attachment surface of the second workpiece. The second workpiece has an attachment hole(s). The SMP workpiece is activated (e.g., heated) to a softening temperature and a portion extruded into the attachment hole of the facing surface of the second workpiece. The SMP piece is held while still heated against the second workpiece, the material flowing as result of the shape memory effect to form an attachment. As the SMP material cools while still under load its modulus increases fixing the attachment geometry. Reheating the attached parts without pushing them together reverses the process.

20 Claims, 2 Drawing Sheets

U.S. PATENT DOCUMENTS

| | | | |
|---|---|---|---|
| 2002/0062547 A1* | 5/2002 | Chiodo et al. | 29/426.5 |
| 2004/0033336 A1* | 2/2004 | Schulte | 428/100 |
| 2004/0247828 A1 | 12/2004 | Brozenick et al. | |
| 2005/0230925 A1* | 10/2005 | Browne et al. | 277/919 |
| 2006/0019510 A1* | 1/2006 | Rudduck et al. | 439/74 |
| 2008/0060175 A1* | 3/2008 | Barvosa-Carter et al. | 24/602 |
| 2010/0293775 A1* | 11/2010 | Barvosa-Carter et al. | 29/525 |
| 2011/0125188 A1* | 5/2011 | Goraltchouk et al. | 606/228 |

* cited by examiner

JOINING POLYMER WORKPIECES TO OTHER COMPONENTS

TECHNICAL FIELD

This invention pertains to the joining of a shape memory polymer workpiece with a surface to a complementary facing surface of a second workpiece.

BACKGROUND OF THE INVENTION

There are many articles of manufacture in which a polymeric part is joined to another part. For example, it is sometimes desired to attach a plastic liner, strip, or panel to a stamped metal panel. In that situation, the polymeric component and the metal panel are positioned or assembled in surface-to-surface contact and an attachment or joining operation is performed.

Mechanical fasteners are often used in such a joining process. This requires an inventory of the fasteners and their handling in the attachment operation. In other applications, adhesives have been used to attach the polymer part(s) to metal surfaces. But adhesive bonding requires application of an adhesive formulation and setting or bonding of the applied adhesive material to make the bond. For many such polymer-to-metal assemblies, the cost and processing complexity of mechanical or adhesive attachment is preferred or can be tolerated. But simpler and less expensive attachment methods could enable other product applications in which a polymeric part is joined to a second workpiece such as a sheet or strip.

SUMMARY OF THE INVENTION

A joining process is disclosed in this specification for attaching a polymeric part or workpiece to a second workpiece. The polymer part has suitable shape memory properties, as will be described, to make the attachment. Such polymer compositions are often called shape memory polymers (SMP). Before describing the joining process it may be helpful to describe SMPs that are suitable for use in the joining process.

Shape memory polymers are compositions of those polymer molecules that exhibit a substantial and reversible change in their elastic modulus when their temperature is increased above a characteristic temperature, known as the switching temperature (Ts). Sometimes the means by which such temperature increase is accomplished is termed "activation" of the shape memory material. When the temperature of a SMP is raised above its Ts, its modulus of elasticity decreases dramatically often by a factor of ten or a hundred, or more. One type of SMPs is a group of semi-crystalline copolymers comprising relatively hard, crystalline segments (or micro phases) and relatively soft, amorphous segments (or micro phases). In this case, the Ts of the copolymer is the glass transition temperature (Tg) of the soft amorphous phase. The soft amorphous segment is the lower temperature softening phase of the shape memory polymer and the elastic modulus of the copolymer drops sharply when the temperature of the material is above its Ts due to a glassy to rubbery transition in the amorphous phase. Other types of SMPs, where the Ts corresponds to melting of one of the phases of the polymer are also known to exist. While the illustrated embodiments of this specification focus on the type of SMPs described above, the invention can be extended to the other types of SMPs without undue effort.

A part made of the SMP described above is imparted a permanent shape by thermo-mechanical processing at a temperature above the melting point (Tm) of the hard segment. Subsequent cooling to a temperature below Ts results in a stiff polymer (e.g. E=800 MPa, where E is the modulus of elasticity of the polymer material at the relatively cold temperature). The material exists as a soft polymer (e.g. E=4 MPa) in the temperature range between Ts and Tm, thereby yielding a two hundred-fold reduction in elastic modulus in this example. When the material is in this temperature range above Ts, it can be deformed easily into different temporary shapes. The elastic elongation (or stretch range) of a typical SMP in its softened condition is about 100% to about 300% without permanent deformation. If the polymer is not degraded (e.g. by plastic yielding, heating beyond its oxidation temperature, etc.), the original permanent shape can be recovered by soaking it at a temperature above the Ts of the soft phase in the absence of external loads. Strains of up to 200%-300% can be recovered in this manner. The material is known to withstand hundreds of cycles of heating with deformation to set a temporary shape and/or heating to recover the permanent shape.

The joining process of this invention utilizes a suitable difference between the lower modulus of elasticity of the soft polymer state of the SMP and higher modulus of the stiff polymer state to, first, establish a soft connection between the polymeric workpiece and the second workpiece and, then, retain a strong connection. One or more through-holes or blind holes are used in the second workpiece to attach the polymeric part. The second part may be of any material having suitable stiffness to accomplish the joining process. In many situations the second workpiece will be a metal workpiece and a practice of the invention will be illustrated with reference to joining a SMP part to a metal part.

The metal workpiece may, for example, be a stamped sheet metal automotive body panel requiring a plastic liner or a plastic strip to be attached to one side. Holes are formed in the metal panel at joining locations for attachment of a polymeric part. The holes may have the form of circles, ovals, slots, slits, or other suitable shape for receiving squeezed or deformed polymeric bonding material. Depending on the shape of the metal part the hole(s) may extend through a thin portion of the part or to a suitable depth in a thicker part (e.g., a blind hole). The shape memory polymeric part may be formed of a suitable thermoplastic or thermosetting composition as will be further described. The SMP part is located against the metal panel so that it overlies one or more of the joining holes. A surface of the polymeric part may be shaped to suitably conform to the shape of the metal part at the area or areas where attachment(s) are to be made. But the surface of the polymeric part does not require preformed studs or other preformed protrusions to obtain the attachment between the facing surfaces.

In accordance with a preferred practice of the invention, a SMP part is attached to a second part, e.g. metal panel, using preformed attachment holes in the metal sheet. The SMP part has a relatively flat or gently contoured surface lacking protrusions in the region overlying the attachment hole(s). At least the attaching region of the SMP part is activated (usually heated) to a suitable temperature above its Ts to reduce the modulus of elasticity. The activated SMP part is pressed against the attachment hole of the metal panel and a portion of softened material from the initially plain surface of the polymeric part is squeezed, deformed, or otherwise suitably displaced under the applied stress into the attachment hole. The displaced material is still activated and seeks to return to its original shape in the surface of the SMP part. But since it is still under the stress of the joining operation and it is confined by the shape of the attachment hole from free elastic return to its original shape, it flows within or around the attachment hole of the second workpiece to form a mechanical interlock with the second workpiece. For example, the SMP material may have been deformed through an attachment hole in the metal panel and then formed a rivet head-like connection in the surface of the polymer workpiece. The re-flowed polymeric material is still subjected to the applied load of the forming operation and it is still warm and soft. It is then cooled below its Ts to strengthen the mechanical attachment between the workpieces while maintaining the applied stress at or near the level used to form the joint. The pressure of the attachment step may then be released after the material has cooled to a temperature $T_2$ below its Ts. In many cases, the greater the difference Ts-$T_2$, the greater is the strength of the joint.

The polymeric part may be heated (or otherwise activated) before or while it is pressed against the metal panel. Heating or activation means may be applied directly to the polymeric workpiece, or the metal panel may be heated in the region of the joining holes so that contact with the heated metal heats the facing surface(s) of the polymeric part.

Subsequent reheating (or otherwise reactivation) of the attached workpieces above the Ts temperature of the workpiece will cause the material to return to its starting geometry in the absence of a deforming load. This allows a simple means for separating the joined components. This internal microstructural-based tendency of a shape memory polymer to return to its molded shape when at sufficiently high temperature and under negligible applied load and the consequent ease with which the joint can be separated when desired further characterizes the joining process of this invention.

The shape of the second workpiece (the metal panel in the above illustration) is limited only by the requirement that the length of the joining hole(s), whether through-holes or expanded blind holes, must accommodate elastic flow (i.e., without permanent deformation) of shape memory polymer material in or through the hole to form a mechanical locking surface. And the shape of the polymer part is limited only to its capability of accommodating the limited extrusion of material from its surface and neighboring volume lying against the joining-hole region in the metal work piece. The practice of the invention may often be used to join a SMP-type polymer strip or sheet to a metal strip or sheet.

The shape memory characteristics of the polymer material generally means that the plastic part can be separated from the metal part by heating the connecting portion of the polymeric part above its Ts temperature, deforming the connecting portion, and separating the parts. As mentioned above, sometimes just heating above Ts under no/light load may be sufficient to separate the joint, i.e., no external effort is required. If the polymeric part is not loaded with an applied external force against the metal part this separation may occur spontaneously due to the shape memory property of the polymer and if the polymeric part remains heated after separation it will return to its original before-joining geometry. In other words, the joining process is fully reversible with little/no degradation in the properties of the SMP for multiple joint formations and subsequent separations.

Other objects and advantages of the invention will be apparent from the following detailed description of certain specific embodiments.

DESCRIPTION OF PREFERRED EMBODIMENTS

Figure 1:
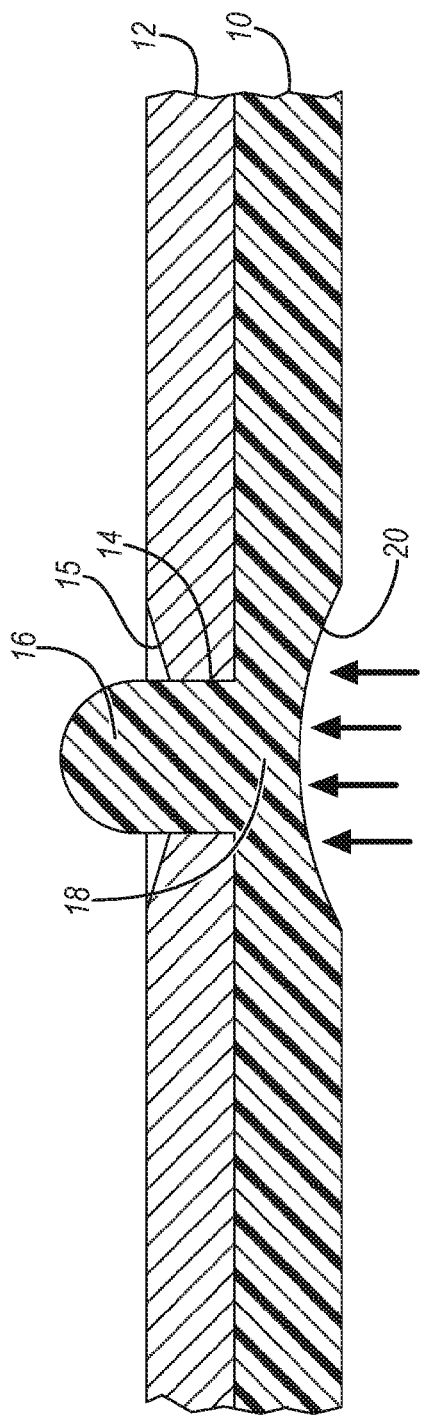
FIG. 1 is a schematic, fragmented, cross-sectional view of a SMP polymeric sheet material positioned facing surface-to-facing surface against a metal plate for attachment to the plate. The polymeric sheet material overlies an attachment hole in the plate. The polymeric material has been heated above its Ts temperature thereby substantially reducing its modulus and a portion of polymeric material from the initially flat surface of the SMP sheet is being pushed and deformed into and through the hole in the metal plate.

Many manufactured articles comprise a polymeric part attached to a metal part. For example, a polymeric strip, slab, or sheet is attached to a formed metal sheet such as a body panel for an automotive vehicle. Of course, the polymer material could be attached to a non-metallic second workpiece having suitable stiffness or rigidity to receive heated and deformed shape memory polymeric material in an attachment hole. This invention makes use of shape memory properties of certain polymer compositions in forming the attachment. A practice of the attachment method is illustrated with reference to the drawing figures.

Figure 2:
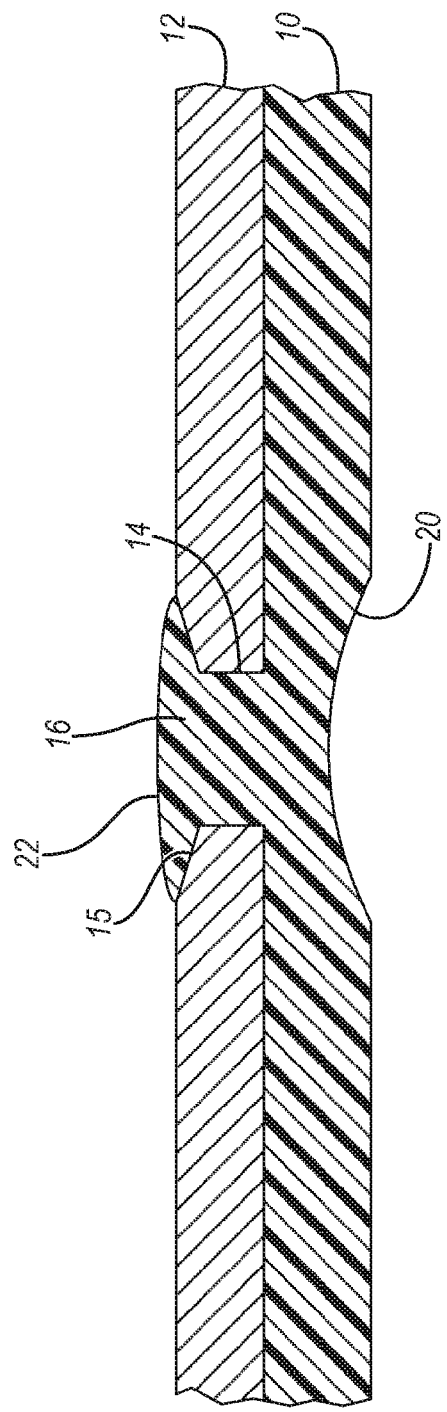
FIG. 2 is a schematic, fragmented, cross-sectional view of the SMP sheet/metal plate assembly of FIG. 1 both while still hot and under externally applied load. The deformed portion of the SMP material while still hot (above its Ts) and loaded against the metal plate has attempted to flow outwardly and back toward its flat surface sheet configuration with the result that the shape memory material forms a rivet-head like mechanical attachment between the plastic sheet and metal plate. After cooling the polymeric material regains its higher modulus of elasticity and forms a strong joint.

FIG. 1 is a cross-sectional view of a small portion of a SMP workpiece in the form of strip 10 which is being attached to a metal panel 12. SMP strip 10 initially has opposing flat surfaces. It requires no pre-formed studs or protuberances for engagement with metal panel 12 or to supply attachment material for the joining operation. Suitably, SMP strip 10 is sized or thick enough to provide shape memory material for forming an attachment to the second workpiece. Where the attachment is made to a through-hole in the metal panel 12, the thickness of SMP strip 10 is preferably at least about 1.1 times the depth of the through-hole. Where the attachment is made to a blind hole in a second workpiece, the thickness of SMP strip 10 is preferably at least about 1.1 times the working depth of the hole. The metal panel 12 may have been formed, for example, by stamping a sheet of steel or aluminum alloy into a shape for an automotive door panel or the like. Metal panels of this type may have a thickness in the range of about one-half millimeter to about three millimeters. Only a portion of the metal panel 12 is shown in FIGS. 1 and 2 to illustrate one point of attachment between the metal part and the SMP part. And the thickness of the illustrated panel is somewhat exaggerated for purposes of the illustration.

Metal panel 12 and shape memory polymer sheet strip 10 are shown in cross-section to show that an attachment hole 14 with a beveled upper surface 15 has been formed in metal panel 12. It is not a necessary condition of the invention to have a bevel on the upper surface of the second workpiece for joining to be accomplished. SMP strip 10 is formed of any suitable polymeric composition that displays shape memory properties.

SMP strip 10 has been positioned against one side of the metal panel 12 so that a portion of an initially flat surface of SMP strip 10 overlies the attachment hole 14. The attachment of SMP strip 10 to metal sheet requires that shape memory material 16 from the initially flat-surface be extruded (pushed, squeezed, or otherwise deformed) through attachment hole 14 as illustrated in FIG. 1. At least a portion of SMP strip 10 in the region 18 of attachment hole 14 must be heated (or otherwise suitably activated) to a suitable softening temperature (i.e. above the Ts temperature of the SMP composition, or otherwise made soft) of the strip material to make the above deformation possible. The heating or activating may be accomplished in any of several different ways. For example, some SMP polymers may be activated by exposure to suitable ultraviolet (UV) radiation. UV activation may soften such material without significantly increasing its macroscopic temperature.

Figure 3:
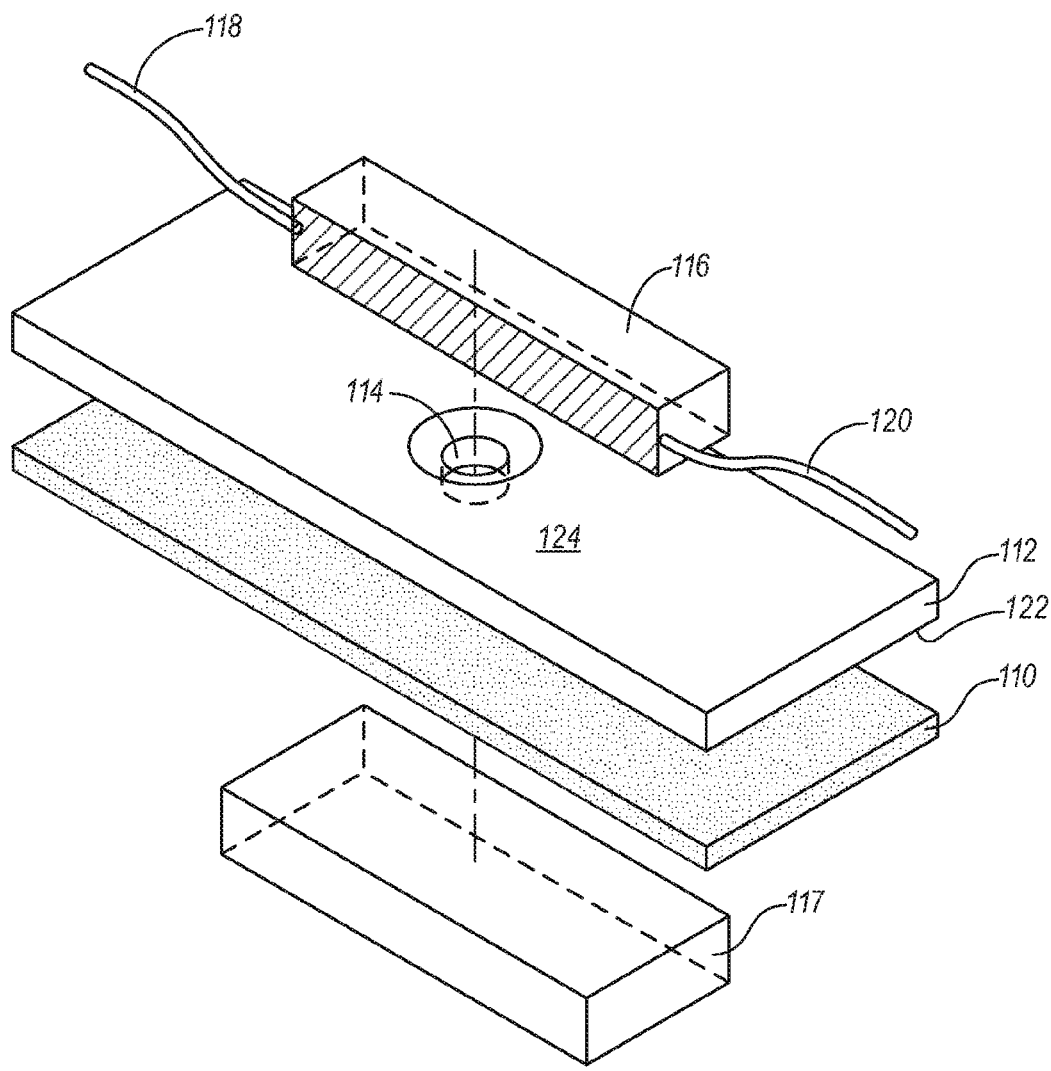
FIG. 3 is an exploded schematic view of a metal plate, with an attachment hole, overlying a SMP polymeric sheet. A supportive and pressure applying member is positioned under the polymeric sheet and an electrical resistance heating element is positioned over the hole in the metal sheet.
Figure 4:
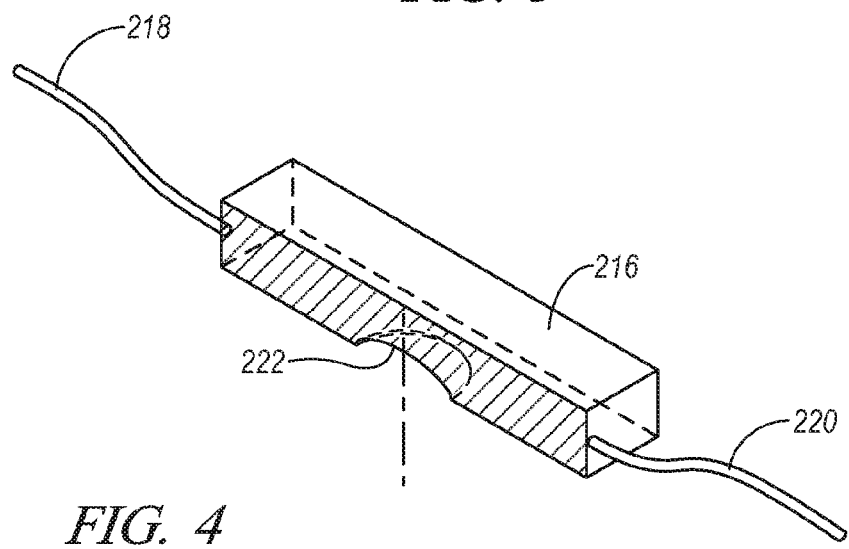
FIG. 4 shows a different embodiment of the electrical heating element of FIG. 3.

The whole SMP strip 10, or one or more attachment regions 18, may be heated above the Ts temperature of the of the material of the polymeric strip 10 before it is placed in side-to-side facing relationship over attachment hole 14. In another practice, the polymeric strip 10 may be assembled against metal panel 12 and then heated. Such in-place heating may be accomplished by heating the metal panel around attachment hole 14 and heating at least region 18 of polymeric strip 10 by conductive heat transfer through and from metal panel 12. Electrical resistance heating blocks for heating the attachment region(s) of metal panel 12 and SMP strip 10 are illustrated in FIGS. 3 and 4 and will be further described below in this specification. Having heated at least region 18 of polymeric strip 10 to a softened condition, a force is applied to the back side 20 (upward force indicated by the arrows in FIG. 1) to extrude softened shape memory material 16 of polymeric strip 10 through preformed attachment hole 14 in metal panel 12.

As activated and softened material 16 remains at a temperature above Ts, and the polymer strip 10 remains pressed against the metal panel 12, the softened shape memory material tries to return to the surface shape of polymeric strip 10 from which it was squeezed or displaced. As the surface tension in the upper portion (as seen in FIG. 1) of the SMP material 16 extruded through attachment hole 14 balances the stress due to the force applied to create the joint, the softened material 16 flattens somewhat against beveled surface 15 to form a convex to flat-head member 22 which may resemble a rivet head. While still pressed against the metal plate the SMP polymeric material is then cooled (or allowed to cool in an ambient environment), which returns it to its higher modulus state. The applied pressure that up to this point has been pressing the polymer to the metal plate can now be removed with this new geometry now being locked in place by the dramatic increase in modulus until such time that the specimen be reheated. Flat to convex head polymeric portion 22 and extruded shape memory polymeric material 16 still held in metal panel hole 14 provide an integral attachment between the illustrated portions of polymeric strip 10 and metal panel 12.

In the embodiment of the invention illustrated in FIGS. 1 and 2 an attachment hole was formed through the metal panel 12. However, in some metal parts an attachment hole may be formed that extends into, but not through, the part (sometimes called a blind hole). In this case, the attachment hole will be enlarged below its surface entry dimension so that the shape memory polymer material can form an enlarged body within the hole for joining the parts.

Important thermal processing characteristics of suitable shape memory polymers have been described above in this specification. Such SMP materials may also otherwise be characterized as thermoplastic polymers, thermoset polymers, or thermoplastic or thermosetting polymers with interpenetrating networks, semi-interpenetrating networks, or mixed networks. The polymers may be a single polymer or a blend of polymers. The polymers may be linear or branched polymeric elastomers with side chains or dendritic structural elements. Shape memory materials are characterized by the presence of two phases, an amorphous or glassy phase (or segment) and a semi-crystalline or crystalline phase (or segment). SMPs have been formed of suitable compositions of urethane copolymers, urethane-diol copolymers, epoxy-cyanate copolymers, and many other copolymer compositions. SMP materials are available for many applications. Their usage in practices of this invention is largely based on being suitably deformable for the joining step and suitably strong at the desired operating temperature of the attached workpieces.

In accordance with this invention it is preferred that the Ts of the SMP workpiece be attainable for a joining operation and above the anticipated operating temperature of the joined workpieces. The difference in elastic modulus of the inactivated SMP workpiece, $E_{inactive}$, and the modulus of the activated workpiece, $E_{active}$, is important in this joining process. It is preferred that the ratio, $E_{inactive}/E_{active}$ be reasonably high for easy and effective displacement of shape memory material for the joining process while retaining high strength of the formed joint. A ratio of at least ten is suitable while a ratio of fifty to about 200 is preferred.

The temperature needed for permanent shape recovery can usually be set at any temperature between about −63° C. and about 120° C., or above. Engineering the composition and structure of the polymer itself can allow for the choice of a particular temperature for a desired application. A preferred temperature for shape recovery is greater than about 120° C.

A most common activator of SMP workpieces is heat. But, depending on a specific SMP material, a workpiece may be activated for joining by means such as electricity, light or other electromagnetic radiation of suitable frequency, pressure, vibration, change in pH, and/or moisture.

As stated, activation is often accomplished by heating a SMP workpiece. FIG. 3 is an exploded view illustrating a method of locally heating a flat surfaced SMP strip 110 as it is positioned and pressed against one side of a metal panel 112 overlying a pre-formed attachment hole 114 in metal panel 112. An anvil member 117 may be used to support and urge SMP strip 110 against the bottom side 122 of metal panel 112. Electrical resistance heating block 116 (shown in cross-section), is heated using electrical leads 118, 120, and is pressed against the upper side 124 of metal panel 112 overlying attachment hole 114. Electrical current is passed through leads 118, 120 and through resistance heating block 116 to heat it to a temperature for heating metal panel 112. Heat is conducted through metal panel 112 into SMP strip 110 so that at least a portion of the SMP panel is heated to its softened phase for extruding an attachment portion through attachment hole 114 in accordance with the joining process described above with reference to FIGS. 1 and 2.

FIG. 4 illustrates another embodiment of electrical resistance heating block 116. In FIG. 4, heating block 216 (shown in cross-section) is heated using electrical leads 218, 220. But heating block 216 has a relieved portion 222 in its heating face to permit extrusion of SMP material as illustrated at 16 in FIG. 1.

The in-place heating practices illustrated in FIGS. 3 and 4 are suitable for rapidly heating SMP material for forming SMP workpiece-to-second workpiece attachments in accordance with this invention. Currently these practices often require access to both the second workpiece side and the SMP workpiece side of the assembly to be attached. Sometimes it is necessary or desirable to form the attachment(s) by operation on only the polymeric part side of the face-to-face polymeric part-to second workpiece assembly. Regardless of the selected method of activating the polymeric part, it is appreciated that in the case of SMP the attachment process can be performed solely from the polymeric part side of the assembly. Activated polymeric material is squeezed or deformed from the polymeric part side into or through the attachment hole(s) in the metal part provided that the metal part has sufficient strength and stiffness to withstand the stress of single-sided joining, to provide one or more columns of attachment material. As the surface tension on the SMP head on the far side of the metal plate (or other second workpiece) balances the stress due to the force applied to create the joint, the extruded SMP material forms a bulbous head somewhat resembling a rivet head. SMP material extruded into a blind hole will assume a bulbous shape depending on the shape of the hole. Subsequent cooling while still under load locks in this deformed shape.

A practice of the invention has been illustrated with the use of electrical resistance heating blocks applied to the metal sheet side of the assembly to be joined. As stated, in many applications of the invention it may be preferred to directly heat the SMP workpiece. And it may be preferred to use other means of heating the SMP workpiece. For example, a joule/conductive/inductive/thermoelectric heater may be built into a pressing apparatus to be applied to the SMP workpiece. Such an arrangement permits heating of the SMP material for extrusion into an attachment hole in the second workpiece. Then, by reversing current flow to the device, the SMP workpiece may be cooled to strengthen the formed attachment shape. In another heater embodiment, a laser heater or a radiant heater may be used in heating one or both sides of the SMP workpiece-second workpiece assembly. In still another heating embodiment, a stream of hot fluid (e.g., air) may be impinged against one or both sides of the assembled SMP and second workpieces. The hot fluid stream may be replaced with a stream of cool fluid for shape-setting of the extruded SMP attachment portion. In many embodiments, the heating and/or cooling means may be incorporated into the device for applying pressure to the SMP workpiece for extrusion of activated material into the attachment hole in the second workpiece.

It is also to be appreciated that an attachment can be undone, and if necessary, remade quickly and easily. Attachment material of the attached SMP workpiece is heated (activated) again to its softening temperature and, if not under load, the activated material flows to return to its original shape. And in so doing the activated material either spontaneously withdraws completely from the attachment hole or it allows detachment to be effected with the application of minimal separating force.

The method of this invention may be practiced using suitable fixtures for joining, for example, a relatively large metal panel to a relatively large polymeric backing sheet. Several attachment holes may be formed at predetermined locations in the metal part just before the attachment steps are started. An advantage of the process is that the SMP workpiece has an initially flat facing surface for the attachment and attachment material is obtained by deforming material from the body of the SMP part.

The practice of the invention has been illustrated by some examples of preferred embodiments of the invention. The illustrations have involved metal panels and polymeric strips, but obviously the method can be practiced on other workpiece and polymer part shapes. Part shapes are limited mainly by the distance that the polymeric material can be made to flow into an attachment hole in the second workpiece. Further, it is appreciated that only attachment regions of the polymer part need be formed of the shape memory material. Accordingly, the specific illustrations in this specification are not intended to limit the proper scope of the invention.

The invention claimed is:

1. A method of attaching a shape memory polymer workpiece to a second workpiece where the workpieces have facing surfaces for the attachment, the method comprising:
    forming an attachment hole in the facing surface of the second workpiece;
    placing the facing surface of the polymer workpiece overlying the attachment hole of the second workpiece, the facing surface of the polymer workpiece having no preformed protuberance for entry into the attachment hole, the facing surface of the second workpiece being in non-deforming contact with the facing surface of the shape memory polymer workpiece;
    activating at least a facing surface region of the shape memory polymer workpiece to a softened condition;
    applying a force to push and deform softened shape memory material from the surface region of the shape memory polymer workpiece into the attachment hole;
    retaining the force against the softened shape memory material while the deformed softened shape memory material extending into or through the hole flows, in an attempt to recover its original facing surface shape, to form a mechanical attachment with the second workpiece; and
    cooling the softened material, while maintaining an external force on it, to strengthen the mechanical attachment between the polymer workpiece and the second workpiece, the shape of such attachment being reversible by activating at least the deformed shape memory material extending through the hole.

2. A method of attaching a shape memory polymer workpiece to a second workpiece as recited in claim 1 in which the polymer workpiece is activated by heating to a softened condition before the polymer workpiece is placed overlying the attachment hole of the second workpiece.

3. A method of attaching a shape memory polymer workpiece to a second workpiece as recited in claim 1 in which the polymer workpiece is activated by heating to a softened condition by direct application of heat to the polymer workpiece.

4. A method of attaching a shape memory polymer workpiece to a second workpiece as recited in claim 1 in which the thickness of the polymer workpiece in the region of its facing surface is greater than the depth of the attachment hole in the second workpiece.

5. A method of attaching a shape memory polymer workpiece to a second workpiece as recited in claim 1 in which the polymer workpiece is a sheet or strip with flat opposing faces and the second workpiece is a metal sheet or panel.

6. A method of attaching a shape memory polymer workpiece to a second workpiece as recited in claim 1 comprising
    placing the facing surface of the polymer workpiece overlying the attachment hole of a metal workpiece as the second workpiece; and heating the metal workpiece to heat the polymer workpiece to a softened condition.

7. A method of attaching a polymer workpiece to a metal workpiece as recited in claim 6 comprising
placing the facing surface of the polymer workpiece overlying the attachment hole of the metal workpiece; and
heating the metal workpiece with a heated block overlying the attachment hole to heat the underlying attachment region of the polymer workpiece to a softened condition.

8. A method of attaching a shape memory polymer workpiece to a second workpiece as recited in claim 1 in which the second workpiece is a metal sheet having a thickness of about one-half millimeter to about three millimeters.

9. A method of attaching a shape memory polymer workpiece to a second workpiece as recited in claim 1 in which the polymer workpiece has a thickness of about two millimeters or greater.

10. A method of attaching a shape memory polymer workpiece to a second workpiece as recited in claim 1 in which the polymer workpiece is activated by heating to a softened condition by contact with a heated body that is also used to apply force for pushing softened shape memory material into the attachment hole.

11. A method of attaching a shape memory polymer workpiece to a second workpiece as recited in claim 1 in which the polymer workpiece is activated by heating to a softened condition by contact with a body that is initially heated and is also used to apply force for pushing softened shape memory material into the attachment hole, the body then being cooled and, by continued contact with the polymer workpiece, used to cool the softened material.

12. A method of attaching a shape memory polymer workpiece to a second workpiece as recited in claim 1 in which the polymer workpiece is activated by heating to a softened condition by directing a stream of heated fluid against the polymer workpiece.

13. A method of attaching a shape memory polymer workpiece to a second workpiece as recited in claim 1 in which the softened material is cooled by directing a stream of cooling fluid against the polymer workpiece.

14. A method of attaching a shape memory polymer workpiece to a second workpiece as recited in claim 1 in which the polymer workpiece is activated by heating to a softened condition by directing a stream of heated fluid against the polymer workpiece and softened material is subsequently cooled by directing a stream of cooling fluid against the polymer workpiece.

15. A method of separating a shape memory polymer workpiece and a second workpiece which have been attached by the method recited in claim 1; the method of separating comprising:
heating at least the attachment portion of the shape memory polymer workpiece to a softened condition without restraining material flow in the attachment portion and
withdrawing the softened attachment portion of the shape memory polymer workpiece from the attachment hole of the second workpiece.

16. A method of attaching a shape memory polymer workpiece to a metal workpiece where the workpieces have facing surfaces for the attachment, the method comprising:
forming an attachment hole in the facing surface of the metal workpiece;
placing the facing surface of the polymer workpiece with its attachment portion overlying the attachment hole of the metal workpiece, the facing surface of the polymer workpiece having no preformed protuberance for engagement with the attachment hole, the facing surface of the metal workpiece being in non-deforming contact with the facing surface of the shape memory polymer workpiece;
heating at least the attachment portion of the polymeric part to a shape memory softened condition;
pushing the softened attachment portion material to extrude it into the attachment hole;
retaining a pushing load against the heated region of the polymer workpiece while the pushed portion extending into or through the hole flows, in an attempt to recover its original facing surface shape, to form a mechanical attachment with the metal part at the hole; and
cooling the extruded softened material, while maintaining an external force on it, to fix and strengthen the mechanical attachment to the metal part, the shape of such attachment being reversible by activating at least the pushed portion extending into or through the hole of the shape memory material extending through the hole.

17. A method of attaching a shape memory polymer workpiece to a metal workpiece as recited in claim 16 in which the thickness of the polymer workpiece in the region of its facing surface is greater than the depth of the attachment hole in the metal workpiece.

18. A method of attaching a shape memory polymer workpiece to a metal workpiece as recited in claim 16 in which the polymer workpiece is a sheet or strip with flat opposing faces and the metal workpiece is a sheet or panel.

19. A method of attaching a shape memory polymer workpiece to a metal workpiece as recited in claim 16 in which the polymer workpiece is activated by heating to a softened condition by direct application of heat to the polymer workpiece.

20. A method of attaching a shape memory polymer workpiece to a metal workpiece as recited in claim 16 in which the polymer workpiece is activated by heating to a softened condition by contact with a heated body that is also used to apply force for pushing softened shape memory material into the attachment hole.

\* \* \* \* \*